US012693706B2

(12) United States Patent
Yang et al.

(10) Patent No.: US 12,693,706 B2
(45) Date of Patent: Jul. 28, 2026

(54) WEARABLE DEVICE FOR SENSING WEARING BY USER

(71) Applicant: SAMSUNG ELECTRONICS CO., LTD., Suwon-si (KR)

(72) Inventors: Sungkwang Yang, Suwon-si (KR); Chulkwi Kim, Suwon-si (KR); Jeongwon Park, Suwon-si (KR); Jongmin Yoon, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/536,247

(22) Filed: Dec. 12, 2023

(65) Prior Publication Data

US 2024/0111334 A1     Apr. 4, 2024

Related U.S. Application Data

(63) Continuation of application No. PCT/KR2022/010380, filed on Jul. 15, 2022.

(30) Foreign Application Priority Data

Sep. 13, 2021   (KR) ........................ 10-2021-0122110
Oct. 13, 2021   (KR) ........................ 10-2021-0136191

(51) Int. Cl.
  G06F 1/16        (2006.01)
  G02B 27/01       (2006.01)
  G06F 3/01        (2006.01)
(52) U.S. Cl.
  CPC ......... G06F 1/163 (2013.01); G02B 27/0172 (2013.01); G06F 3/013 (2013.01); G06F 3/017 (2013.01); *G02B 2027/0178* (2013.01)

(58) Field of Classification Search
  CPC .......... G06F 1/163; G06F 3/013; G06F 3/017; G06F 1/16; G06F 3/01; G02B 27/0172;
(Continued)

(56) References Cited

U.S. PATENT DOCUMENTS 5,635,948  A     6/1997  Tonosaki
8,184,067  B1    5/2012  Braun et al.
(Continued)

FOREIGN PATENT DOCUMENTS

JP        2015202198 A      11/2015
JP        2015205114 A      11/2015
(Continued)

OTHER PUBLICATIONS

International Search Report mailed Oct. 27, 2022 for PCT/KR2022/010380, citing the above reference(s).
(Continued)

*Primary Examiner* — Michael A Faragalla
(74) *Attorney, Agent, or Firm* — CANTOR COLBURN LLP

(57)     ABSTRACT

A wearable device include at least one display including a first surface and a second surface opposite the first surface, where external light directed to the first surface display information on the second surface; an electronic component disposed on a part of the user's body when the wearable device is worn by a user; a first processor is operatively coupled to the electronic component; and a second processor is operatively coupled to the second processor. The first processor identifies a change in capacitance of the electronic component while the second processor is in an inactive state, generates a switching signal for switching a state of the second processor to an active state based on the identification of the change in capacitance, and the second processor switches the state of the second processor from the inactive (Continued)

state to the active state based on a reception of the switching signal.

18 Claims, 12 Drawing Sheets

(58) Field of Classification Search
CPC . G02B 2027/0178; G02B 27/01; G02C 11/00
See application file for complete search history.

(56) References Cited

U.S. PATENT DOCUMENTS

| | | | |
|---|---|---|---|
| 8,264,527 B2 | 9/2012 | Matsumura | |
| 8,907,867 B2 | 12/2014 | Wong et al. | |
| 8,994,797 B2 | 3/2015 | Yoshino | |
| 9,195,065 B2 | 11/2015 | Ozawa et al. | |
| 9,204,397 B2 | 12/2015 | Raffle et al. | |
| 9,630,098 B2 | 4/2017 | Mikhailov et al. | |
| 9,772,494 B2 | 9/2017 | Rabii | |
| 10,722,128 B2 * | 7/2020 | Mason | A61B 5/02427 |
| 2012/0194419 A1 * | 8/2012 | Osterhout | G02B 27/017 |
| | | | 345/156 |
| 2013/0088406 A1 * | 4/2013 | Hamada | H01Q 9/42 |
| | | | 343/893 |
| 2015/0062022 A1 | 3/2015 | Rabii | |
| 2015/0301337 A1 | 10/2015 | Park et al. | |
| 2017/0090200 A1 * | 3/2017 | Motoe | G02B 27/0176 |
| 2017/0322416 A1 | 11/2017 | Osterhout | |
| 2018/0081201 A1 * | 3/2018 | Lore | A61B 5/02438 |
| 2019/0080641 A1 | 3/2019 | Wu | |
| 2019/0318677 A1 * | 10/2019 | Lu | G02B 27/0093 |
| 2020/0073122 A1 * | 3/2020 | Rothkopf | G09G 3/20 |
| 2021/0169420 A1 | 6/2021 | Jung | |

FOREIGN PATENT DOCUMENTS

| | | | |
|---|---|---|---|
| JP | 2016527601 A | 9/2016 | |
| JP | 2016536684 A | 11/2016 | |
| KR | 20150119636 A | 10/2015 | |
| KR | 20160087907 A | 7/2016 | |
| KR | 20210073274 A | 6/2021 | |

OTHER PUBLICATIONS

The extended European search report for EP Application No. 22867543.5 mailed on Nov. 11, 2024, citing the above reference(s).
Korean Office Action for KR Application No. 10-2021-0136191 mailed on Apr. 29, 2026.

* cited by examiner

WEARABLE DEVICE FOR SENSING WEARING BY USER

CROSS-REFERENCE TO RELATED APPLICATIONS

This application is a continuation of PCT International Application No. PCT/KR2022/010380, which was filed on Jul. 15, 2022, and claims priority to Korean Patent Application No. 10-2021-0122110, filed on Sep. 13, 2021, and claims priority to Korean Patent Application No. 10-2021-0136191, filed on Oct. 13, 2021, in the Korean Intellectual Property Office, the disclosure of which are incorporated by reference herein their entirety.

BACKGROUND

1. Field

Various embodiments of the invention relate to a wearable device for detecting a user's wearing.

2. Description of Related Art

The wearable device may be worn on a part of the user's body and used frequently for a short time. The wearable device may be provided as various types of products. For example, the wearable device may include a glasses-type device for providing augmented reality (AR) or virtual reality (VR) to a user.

A wearable device formed of a glasses-type device may include a display disposed at a position corresponding to the eyes of the user and a frame capable of supporting the display, and may be disposed at a designated position by attaching a part of the frame to the user's body when the user wears the wearable device.

SUMMARY

A wearable device may be manufactured to correspond to light-weighting and a part of the body, on which the wearable device is worn, in order to provide comfort to the user when worn on a part of the user's body. Since the wearable device may be configured to include various electronic components therein to perform various functions, the design of the wearable device is limited, and the internal mounting space is narrow. When the wearable device includes a separate sensor for detecting a user's wearing, the design of the wearable device may be further limited such that mounting electronic components may not be effectively provided therein.

Various embodiments of the invention may detect whether a user wears a wearable device based on a change in capacitance of an electronic component that occurs when contacting a user's body and may be switched from an inactive state to an active state.

The technical task to be achieved in the disclosure is not limited to the technical tasks mentioned above, and other technical tasks not mentioned may be clearly understood by those skilled in the art from the following description.

According to an embodiment, a wearable device includes at least one display including a first surface and a second surface opposite the first surface, where external light directed to the first surface displays information on the second surface; an electronic component disposed on a part of the user's body when the wearable device is worn by a user; a first processor may be operatively coupled to the electronic component; and a second processor may be operatively coupled to the first processor; where the first processor may be configured to: identify a change in capacitance of the electronic component while the second processor is in an inactive state; generate a switching signal for switching a state of the second processor to an active state based at least in part on an identification of the change in capacitance, where the second processor may be configured to: switch the state of the second processor from the inactive state to the active state based on a reception of the switching signal.

According to an embodiment, a wearable device includes at least one display, including a first surface and a second surface opposite the first surface, where external light directed to the first surface displays information on the second surface; a frame including a plurality of rims surrounding at least one display and a support part disposed between the rims; an electronic component disposed in a portion of the frame in contact with a part of a user's body when the wearable device is worn by the user; a camera disposed in the frame and configured to track a user's gaze; a first processor operatively coupled with the camera and the electronic component; and a second processor operatively coupled to the first processor, where the first processor may be configured to: identify a change in capacitance of the electronic component while the second processor is in an inactive state; activate the camera in response to identifying a change in capacitance that exceeds a threshold, and obtain one or more images related to the user's pupil based on a designated period through the activated camera; identify a visual object related to the user's pupil in the one or more images; transmit the switching signal for switching the state of the second processor to the active state to the second processor, in response to the identification of the visual object; wherein the second processor may be configured to: switch the state of the second processor from the inactive state to the active state based on the reception of the switching signal.

When the wearable device is worn by the user, the wearable device including a configuration of identifying a change in capacitance of an electronic component disposed on a part of the user's body and generating a switching signal for switching from an inactive state to an active state based on the switching signal by detecting the wear of the user without using a separate sensor for detecting the user's wearing. The wearable device can detect the user's wearing using at least one electronic component that performs various functions, thereby facilitating the design of the wearable design and realizing a weight reduction.

The effects that can be obtained from the disclosure are not limited to those described above, and any other effects not mentioned herein will be clearly understood by those having ordinary knowledge in the art to which the disclosure belongs, from the following description.

DETAILED DESCRIPTION

Hereinafter, embodiments of the invention will be described in detail with reference to the accompanying drawings.

Figure 1:
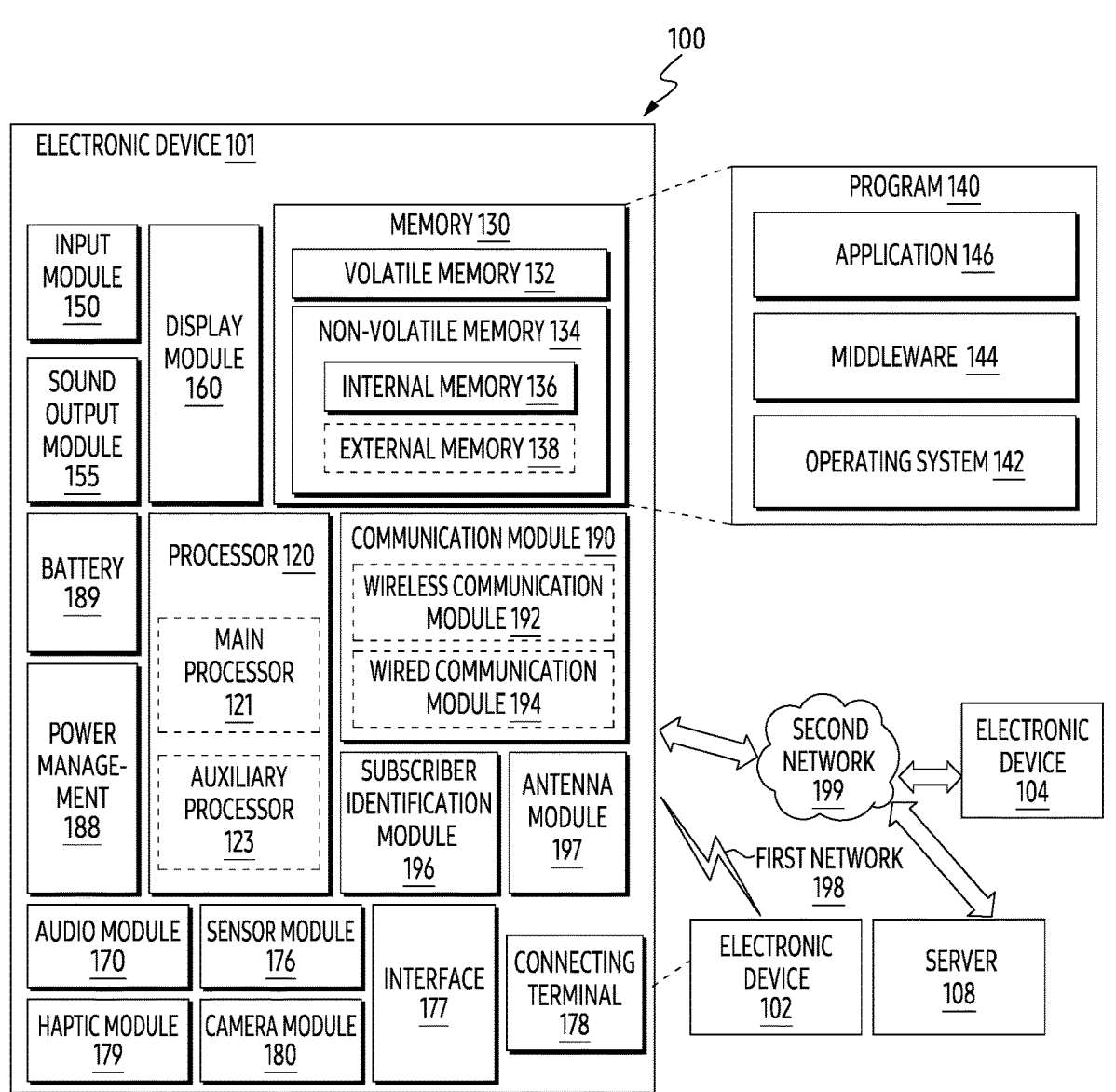
FIG. 1 is a block diagram of an electronic device in a network environment according to various embodiments.

FIG. 1 is a block diagram illustrating an electronic device 101 in a network environment 100 according to various embodiments.

Referring to FIG. 1, an embodiment of the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. In an embodiment, for example, where the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN))). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such an embodiment, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, in a case where the electronic device 101 performs a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an alternative embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2A:
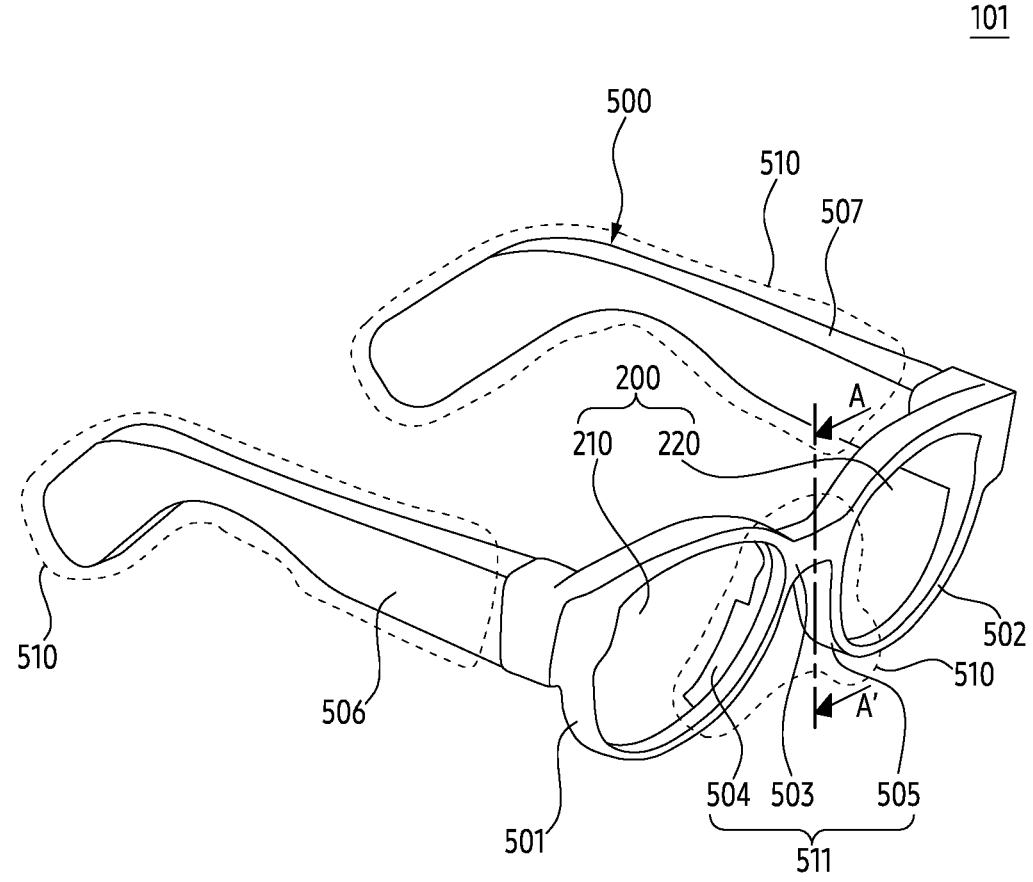
FIG. 2A is a perspective view of an electronic device according to various embodiments.
Figure 2B:
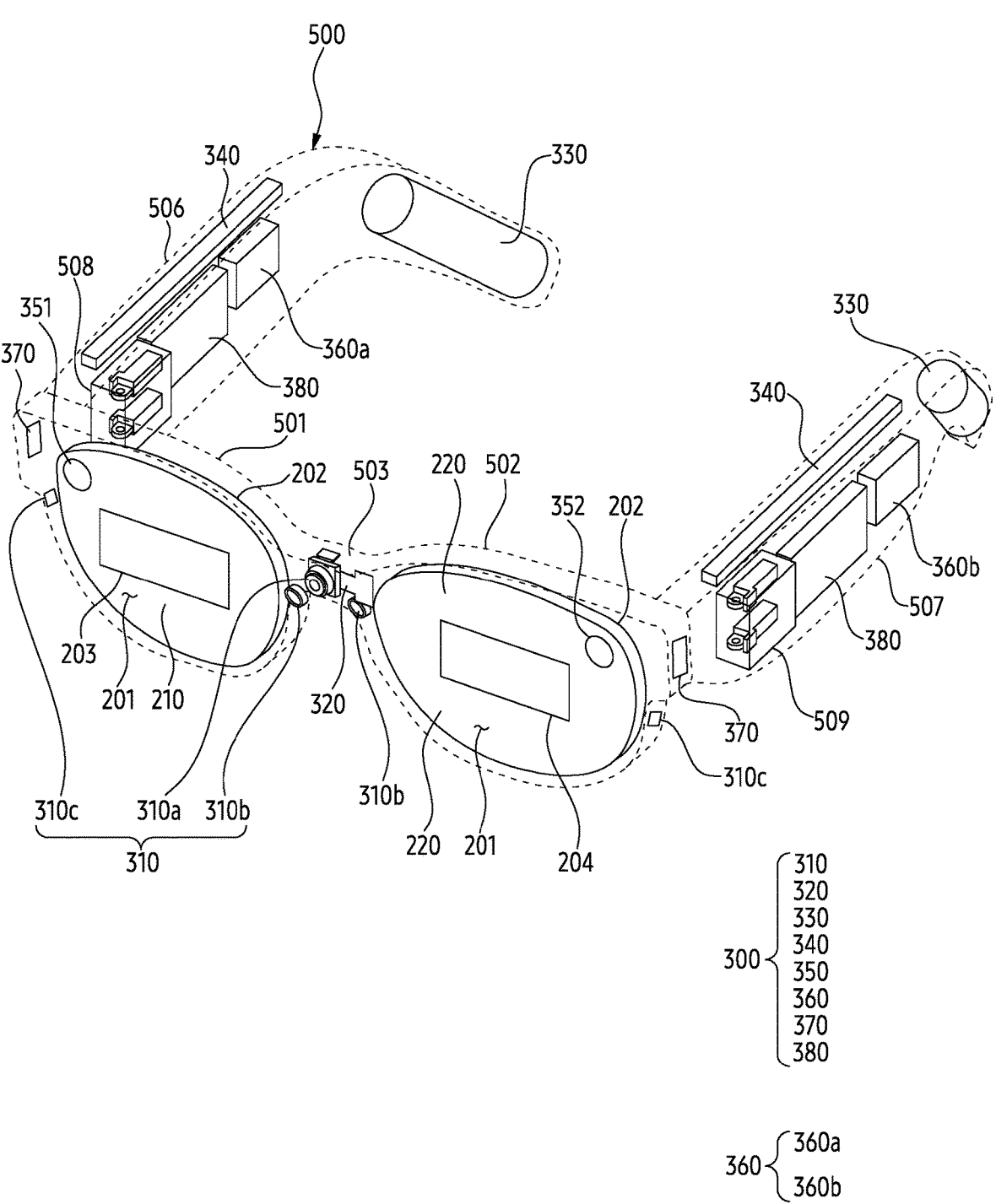
FIG. 2B is an arrangement view of an electronic component included in an electronic device according to various embodiments.

FIG. 2A is a perspective view of an electronic device according to various embodiments and FIG. 2B is an arrangement view of an electronic component included in an electronic device according to various embodiments.

Referring to FIGS. 2A and 2B, an embodiment of the electronic device 101 (e.g., the electronic device 101 of FIG. 1) may include a frame 500, at least one display 200, an electronic component 300, a first processor (e.g., the auxiliary processor 123 of FIG. 1), and/or a second processor (e.g., the main processor 121 of FIG. 1).

According to an embodiment, the electronic device 101 may be referred to as a wearable device configured to be worn on a part of the user's body. The electronic device 101 may provide augmented reality (AR), virtual reality (VR), or mixed reality (MR) in which augmented reality and virtual reality are mixed to a user wearing the electronic device 101 through the photographing camera 310a, the motion recognition camera 310c, and at least one optical device 351 and 352. For example, the electronic device 101 may combine virtual reality information provided from at least one optical device 351 and 352 with a reality image collected through the photographing camera 310a in response to a user's designated gesture obtained through the motion recognition camera 310c and display it on at least one display 200.

In an embodiment, at least one display 200 is a configuration for providing visual information to a user, and may include, for example, a transparent or translucent lens. The at least one display 200 may include, for example, a first display 210 and/or a second display 220 spaced apart from the first display 210. For example, the first display 210 and the second display 220 may be disposed at positions corresponding to the user's left and right eyes, respectively.

Referring to FIG. 2B, the at least one display 200 may provide visual information transmitted from external light to a user through a lens included in the at least one display 200, and other visual information distinguished from the visual information. For example, at least one display 200 may include a first surface 201 and a second surface 202 opposite to the first surface 201. When the user wears the electronic device 101, external light may be transmitted to the user by being incident on the first surface 201 and transmitted through the second surface 202. As another example, the at least one display 200 may display a combined image of a reality image collected through the photographing camera 310a and a virtual reality image provided by the at least one optical device 351 and 352. At least one display 200 may include at least one waveguide 203 and 204 for diffracting light transmitted from at least one optical device 351 and 352 and propagating to at least one display 200. The electronic device 101 may analyze an object included in the real image collected through the photographing camera 310a, combine a virtual object corresponding to an object to be provided with augmented reality among the analyzed objects, and display it on at least one display 200. The virtual object may include at least one of text and images for various information related to the object included in the real image. A user wearing the electronic device 101 may view an image displayed on at least one display 200.

In an embodiment, the frame 500 may be defined by or formed of a physical structure in which the electronic device 101 may be worn on a part of the user's body. According to an embodiment, the frame 500 may be configured so that when the user wears electronic device 101, the first display 210 and the second display 220 may be positioned corresponding to the user's right and left eyes. The frame 500 may support the first display 210 and the second display 220 to be positioned at positions corresponding to the user's right and left eyes. In an embodiment, as shown in FIG. 2A, for example, the frame 500 may include a first rim 501 surrounding at least a part of the first display 210, a second rim 502 surrounding at least a portion of the second display 220, a bridge 503 disposed between the first rim 501 and the second rim 502, the first pad 504 disposed from one end of the bridge 503 along a portion of the edge of the first rim 501, the second pad 505 disposed along a portion of the edge of the second rim 502 from the other end of the bridge 503, a first temple 506 extending from the first rim 501 and fixed to a portion of the wearer's ear, and the second temple 507 extending from the second rim 502 and fixed to a portion of the opposite ear of the ear. For example, the templates 506 and 507 may be pivotably or rotatably connected to the rim 501 and 502 through hinge units 508 and 509. The first temple 506 may be rotatably connected to the first rim 501 through a first hinge unit 508 disposed between the first rim 501 and the first temple 506. The second temple 507 may be rotatably connected to the second rim 502 through a second hinge unit 509 disposed between the second rim 502 and the second temple 507.

When the user wears the electronic device 101, the frame 500 may include a region 510 in which at least a part thereof contacts a part of the user's body. For example, the region 510 in contact with a part of the user's body of the frame 500 may include a region in contact with a part of the user's nose, a region in contact with a part of the user's ear, and a region in contact with a part of the side of the user's face. In an embodiment, the first pad 504 and the second pad 505 may contact a part of the user's nose, and the first temple 506 and the second temple 507 may contact a part of the user's face and a part of the ear. A region 510 in contact with a part of the user's body may include a first pad 504, a second pad 505, a first temple 506, and a second temple 507.

In an embodiment, the electronic component 300 may be components that perform various functions of the electronic device 101. For example, the electronic component 300 may include a camera 310, a flexible printed circuit board 320 extending from the camera 310 and electrically connected to the first processor, a battery module 330, an antenna module 340, at least one optical device 351 and 352, sound output modules 360a and 360b, a light emitting module 370, and/or a printed circuit board 380. Various electronic components 300 may be disposed on the frame 500 to perform a specific function.

In an embodiment, at least one optical device 351 and 352 may project a virtual object onto at least one display 200 to provide various image information to a user. For example, at least one optical device 351 and 352 may be a projector. At least one optical device 351 and 352 may be disposed adjacent to at least one display 200 or may be provided as a part of at least one display 200. According to an embodiment, at least one optical device 351 and 352 may include a first optical device 351 corresponding to the first display 210 and a second optical device 352 corresponding to the second display 220. For example, at least one optical device 351 and 352 may include a first optical device 351 disposed at an edge of the first display 210 and a second optical device 352 disposed at an edge of the second display 220. The first optical device 351 may transmit light to the first waveguide 203 disposed on the first display 210, and the second optical device 352 may transmit light to the second waveguide 204 disposed on the second display 220.

In various embodiments, the camera 310 may include a photographing camera 310a, an eye tracking camera (ET CAM) (also, referred to as "gaze tracking camera") 310b, and/or a motion recognition camera 310c. The photographing camera 310a, the eye tracking camera 310b, and the motion recognition camera 310c may be disposed at different positions on the frame 500 and may perform different functions from each other.

The photographing camera 310a may photograph an actual image or background to match a virtual image in order to implement augmented reality or mixed reality content. The photographing camera 310a may photograph an image of a specific object existing at a position viewed by the user and provide the image to at least one display 200. At least one display 200 may display information on an actual image or background including the image of the specific object obtained using the photographing camera 310a, and one image overlapped or combined with a virtual image provided through at least one optical device 351 and 352. In an embodiment, the photographing camera 310a may be disposed on a bridge 503 disposed between the first rim 501 and the second rim 502.

The gaze tracking camera 310b may implement a more realistic augmented reality by matching the user's gaze with visual information provided to the display 200 by tracking the gaze of the user wearing the electronic device 101. For example, when the user looks forward, electronic device 101 may naturally display environmental information related to the user's front at a place where the user is located on display 200. The gaze tracking camera 310b may be configured to capture an image of the user's pupil to determine the user's gaze. For example, the gaze tracking camera 310b may receive gaze detection light reflected from the user's pupil and track the user's gaze based on the position and movement of the received gaze detection light. In an embodiment, the gaze tracking camera 310b may be disposed at positions corresponding to the user's left and right eyes. For example, the gaze tracking camera 310b may be disposed to face a direction in which the eyes of the user wearing the electronic device 101 is positioned in the first rim 501 and/or the second rim 502.

Motion recognition camera 310c may provide a specific event on a screen provided to display 200 by recognizing the movement of all or part of the user's body, such as the user's body, hand, or face. The motion recognition camera 310c may recognize a user's gesture to obtain a signal corresponding to the motion and may provide a display corresponding to the signal to the display 200. The second processor may identify a signal corresponding to the operation and perform a designated function based on the identification. In an embodiment, the motion recognition camera 310c may be disposed on the first rim 501 and/or the second rim 502. The second processor may identify a signal corresponding to the motion and perform a designated function based on the identification. In an embodiment, the motion recognition camera 310c may be disposed on the first rim 501 and/or the second rim 502.

The battery module 330 may supply power to the electronic components 300 of the electronic device 101. The battery module 330 may be referred to as the battery described above (e.g., the battery 189 of FIG. 1). In an embodiment, the battery module 330 may be disposed in the first temple 506 and/or the second temple 507. For example, the battery module 330 may be a plurality of battery modules. A plurality of battery modules may be disposed in the first temple 506 and the second temple 507, respectively. In an embodiment, the battery module 330 may be disposed at an end portion of the first temple 506 and/or the second temple 507.

The antenna module 340 may transmit a signal or power to the outside of the electronic device 101 or receive a signal or power from the outside. The antenna module 340 may be referred to as the antenna module (e.g., the antenna module 197 of FIG. 1) described above. In an embodiment, the antenna module 340 may be disposed in the first temple 506 and/or the second temple 507. For example, the antenna module 340 may be disposed close to one surface of the first temple 506 and/or the second temple 507. In an embodiment, the antenna module 340 may be disposed toward one surface opposite to the other surface in contact with the user's body when the user wears the electronic device 101.

The sound output modules 360*a* and 360*b* may output sound signals to the outside of the electronic device 101. The sound output modules 360*a* and 360*b* may be referred to as the sound output modules (e.g., the sound output module 155 of FIG. 1) described above. In an embodiment, the sound output modules 360*a* and 360*b* may be disposed in the first temple 506 and/or the second temple 507 to be disposed adjacent to the user's ear wearing the electronic device 101. For example, the sound output modules 360*a* and 360*b* may include a first sound output module 360*a* disposed adjacent to the user's right ear by being disposed in the first temple 506 and a second sound output module 360*b* disposed adjacent to the user's left ear by being disposed in the second temple 507.

The light emitting module 370 may include at least one light emitting element. In an embodiment, the light emitting module 370 may emit light of a color corresponding to the specific state or emit light in an operation corresponding to the specific state to visually provide information on a specific state of the electronic device 101. For example, when charging is desired, the electronic device 101 may emit red light at a certain period. In an embodiment, the light emitting module 370 may be disposed on the first rim 501 and/or the second rim 502.

In an embodiment, the first processor may be referred to as the auxiliary processor (e.g., the auxiliary processor 123 of FIG. 1), and the second processor may be referred to as the main processor (e.g., the main processor 121 of FIG. 1). In an embodiment, the first processor and the second processor may be mounted on the printed circuit board 380 included in the electronic device 101.

The second processor may control the electronic component 300 of the electronic device 101 by executing software (e.g., the program 140 of FIG. 1). In various embodiments, the first processor may be operatively coupled to the second processor and transmit a switching signal for switching the second processor from an inactive state to an active state to the second processor. According to an embodiment, the first processor may directly transmit a signal for switching the second processor from an inactive state to an active state to the second processor or request transmission to the second processor through the electronic component 300 or the power management module 188 of FIG. 1. The active state may mean a mode in which a screen is displayed through at least one display 200 while the second processor is in a wake-up state. The wake-up state may mean a state in which a power management integrated circuit (PMIC) of the electronic device 101 provides steady state power to a second processor. The inactive state may mean a mode in which a screen is displayed through at least one display 200 while the second processor is in a sleep state. The sleep state may mean a turn-off state requiring booting to switch to the wake-up state. The sleep state may mean a state in which the PMIC (not shown) of the electronic device 101 stops providing power to the second processor. The sleep state may mean a state in which the second processor does not require booting for switching to the active state, but requires obtaining normal power from the PMIC for switching to the active state. The sleep state may mean a state in which power lower than a reference power is obtained from the PMIC of the electronic device 101. The inactive state may include at least one selected from an idle state, a standby state, and a low power state.

In an embodiment, at least a part of the electronic component 300 may be disposed on a part of the user's body when the electronic device 101 is worn by the user. In an embodiment, the electronic component 300 may be disposed in the region 510 of the frame 500 in contact with a part of the user's body. The electronic component 300 may be in contact with or close to a part of the user's body when the user wears the electronic device 101. In an embodiment, the first processor may identify a change in capacitance of the electronic component 300 while the second processor is in an inactive state by being operatively coupled to the electronic component 300. In an embodiment, a change in capacitance of the electronic component 300 may mean a change in capacitance that occurs when at least a part of the electronic component 300 contacts or approaches a part of the user's body. In an embodiment, the electronic component 300 does not necessarily have to physically contact a part of the user's body in order to cause a change in capacitance, and may occur when a part of the electronic component 300 and a part of the user's body are close to each other by a predetermined distance. For example, when the electronic component 300 approaches the user's face, a change occurs in a capacitance value formed between the driver electrodes of the electronic component 300, and a signal transmitted between the electrodes may change due to the change in the capacitance value. The first processor may be configured to obtain a change in the signal and transmit a switching signal for switching the second processor to the active state based at least in part on identification. The second processor may be configured to switch the state of the second processor from the inactive state to the active state based on reception of the switching signal from the first processor.

Although not illustrated in FIG. 2B, in an embodiment, the electronic device 101 may further include a sensor module such as a 6-axis sensor, a pressure or electrocardiogram sensor, a position-based service module for confirming a user's position, or a voice recognition module for recognizing a user's voice.

Figure 3A:
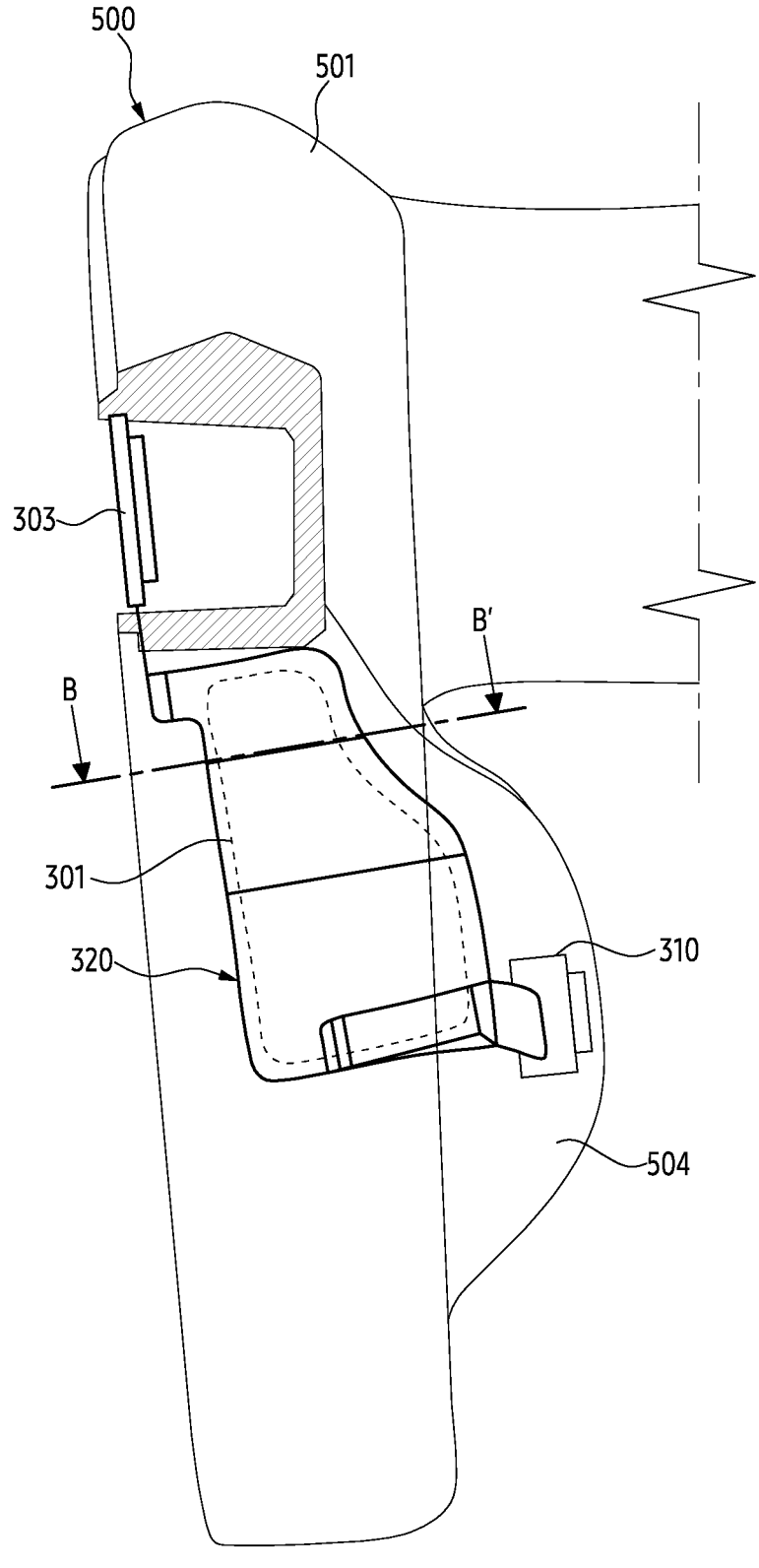
FIG. 3A is a section view of an electronic device cut along line A-A' of FIG. 2A, according to an embodiment.
Figure 3B:
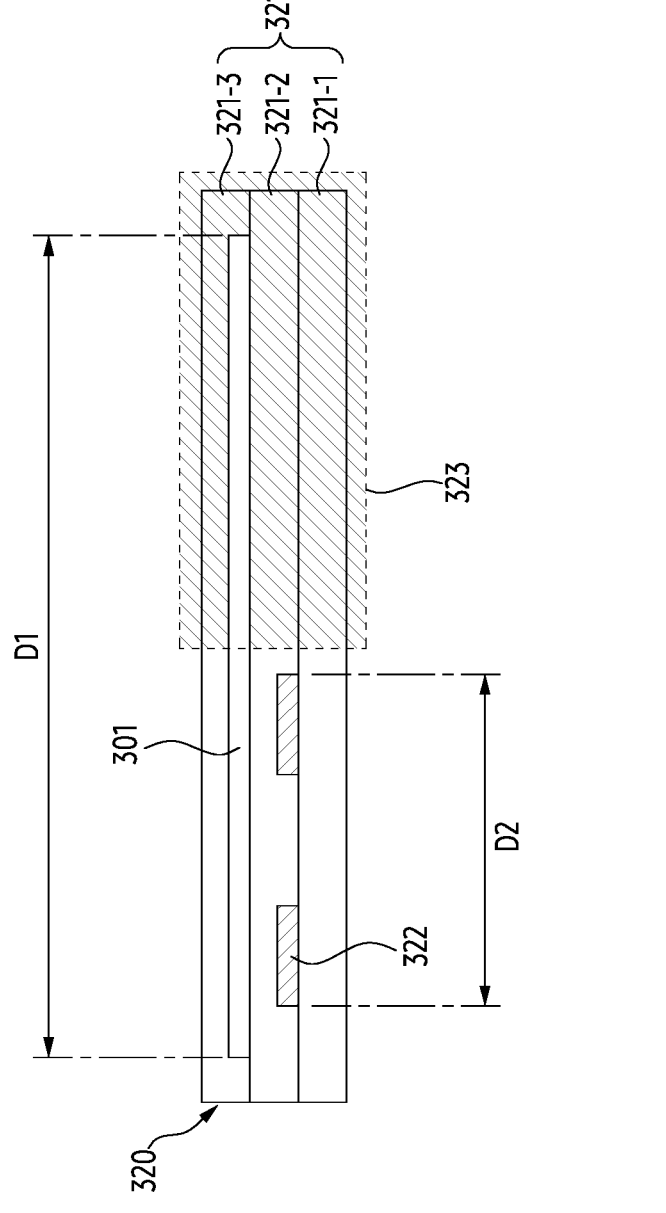
FIG. 3B is a section view of a flexible printed circuit board constituting an electronic device cut along B-B' of FIG. 3A, according to an embodiment.

FIG. 3A is a section view of an electronic device cut along line A-A' of FIG. 2A, and FIG. 3B is a section view of a flexible printed circuit board constituting the electronic device along line B-B' of FIG. 3A, according to an embodiment.

Referring to FIGS. 3A and 3B, the electronic device 101 according to an embodiment may include a camera 310 and a flexible printed circuit board 320 extending from the camera 310 to be electrically connected to a first processor (e.g., the auxiliary processor 123 of FIG. 1) and including a conductive member 301. The flexible printed circuit board 320 may be electrically connected to the first processor through a connector 303.

According to an embodiment, the electronic device 101 may detect whether the electronic device 101 is worn by a user based at least in part on identification of a change in capacitance of the conductive member 301. For example, when the user wears the electronic device 101, the first processor may identify a change in capacitance of the conductive member 301 and identify whether the user wears the electronic device 101 based on the identification.

In an embodiment, the conductive member 301 may include conductive materials including a plurality of charged particles that may freely move when being in contact with or close to a part of the user's body. For example, the conductive member (301) may include a metal material such as silver, copper, or aluminum, but is not limited thereto.

In an embodiment, when the electronic device 101 is worn by the user, the conductive member 301 may be disposed on an area corresponding to an area in contact with a part of the user's body (e.g., a region 510 in contact with a part of the user's body in FIG. 2A) in the frame 500. For example, the conductive member 301 may be electrically connected to the first processor along at least one of the first pad 504 and the second pad 505, so as to be in contact with or close to a part of the nose of the user wearing the electronic device 101. A change in capacitance may occur when the conductive member 301 contacts or approaches a part of the user's body, and the first processor may identify a change in capacitance of the conductive member 301.

In an embodiment, the conductive member 301 may be a thin metal film disposed on the non-conductive layer 321 of the flexible printed circuit board 320. The flexible printed circuit board 320 may include components for implementing various functions of the camera 310. In the flexible printed circuit board 320, a non-conductive layer 321 and a conductive layer may be stacked in several layers. Referring to FIG. 4B, the flexible printed circuit board 320 may include a plurality of non-conductive layers 321, a conductive pattern 322, and a conductive member 301. For example, in the flexible printed circuit board 320, a conductive pattern 322 may be printed on the first non-conductive layer 321-1, and a second non-conductive layer 321-2 may be disposed on an upper surface of the first non-conductive layer 321-1. In the flexible printed circuit board 320, a conductive member 301 may be disposed on the second non-conductive layer 321-2, and a third non-conductive layer 321-3 may be disposed on an upper surface of the second non-conductive layer 321-2. The first non-conductive layer 321-1, the second non-conductive layer 321-2, and the third non-conductive layer 321-3 may be films including or made of polyimide. In an embodiment, for example, the conductive pattern 322 made of a material such as copper may be electrically connected to at least one of components of the electronic device 101 such as the camera 310 as a conductive path, a processor, a printed circuit board, or a PMIC.

In an embodiment, the conductive member 301 may be formed between a plurality of conductive layers 321 forming the flexible printed circuit board 320. For example, the conductive member 301 may be disposed on the second non-conductive layer 321-2. The conductive member 301 may be, for example, a thin film of silver, copper, or aluminum. The conductive member 301 may be disposed inside the flexible printed circuit board 320, but is not limited thereto, and the conductive member 301 may form a part of the surface of the flexible printed circuit board 320.

In an embodiment, the conductive member 301 may be disposed on the non-conductive layer 321 of the flexible printed circuit board 320 at a position corresponding to the region 510 in contact with a part of the user's body. For example, the conductive member 301 may be disposed on a region of the flexible printed circuit board 320 corresponding to the first pad 504 or the second pad 505. The flexible printed circuit board 320 may extend from the camera 310 to the first processor through the first pad 504 or the second pad 505, and the conductive member 301 may be disposed inside at least one of the first pad 504 and the second pad 505. In an embodiment, the flexible printed circuit board 320 may include a signal line connected to the camera 310.

In an embodiment, the width D1 of the conductive member 301 on the flexible printed circuit board 320 may be wider than the width D2 on which the conductive patterns 322 are disposed on the flexible printed circuit board 320. For example, when the flexible printed circuit board 320 is viewed from above, in the flexible printed circuit board 320, the conductive pattern 322 may overlap the conductive member 301.

Since the flexible printed circuit board has a width sufficient to surround the conductive pattern, the width of the conductive member 301 may be equal to or greater than a width of the flexible printed circuit board on which the conductive pattern is disposed.

According to an embodiment, the flexible printed circuit board 320 may have a width capable of surrounding the conductive member 301 disposed at a position corresponding to the region 510 in contact with a part of the user's body in the frame 500. In an embodiment, since the flexible printed circuit board 320 has a width capable of surrounding the conductive member 301, compared to a flexible printed circuit board that does not include a conductive member, the substrate of the flexible printed circuit board 320 may be expanded in width by a region 323 in which the conductive member 301 and the conductive pattern 322 do not overlap. In an embodiment, the width of the flexible printed circuit board 320 may be determined by the width D1 of the conductive member 301 in the flexible printed circuit board 320. Since the width D1 of the conductive member 301 is wider than the width D2 of a portion of the flexible printed circuit board 320 on which the conductive pattern 322 is disposed, the width of a portion of the flexible printed circuit board 320 including the conductive member 301 may be greater than the width of a conventional flexible printed circuit board that does not include a conductive member.

According to an embodiment, as described above, the electronic device 101 may detect the user's wearing and generate a switching signal for activating the second processor (e.g., the main processor 121 of FIG. 1) using the flexible printed circuit board 320 for implementing the function of the camera 310 without a separate sensor for detecting the user's wear by including a flexible printed circuit board 320 including a conductive member 301. For example, when the electronic device 101 according to an embodiment is worn by a user, a change in capacitance may occur by the conductive member 301 disposed on the flexible printed circuit board 320 contacts or approaches the user's nose. The first processor may generate a switching signal by identifying the change in capacitance and transmit the switching signal to the second processor, so that the second processor may switch to an active state.

According to an embodiment, the electronic device 101 may include a conductive member 301 in the flexible printed circuit board 320. The electronic device 101 may detect whether the user wears the electronic device 101 using the conductive member 301. Since the electronic device 101 uses the conductive member 301 instead of a separate sensor, it is possible to save a space disposed and improve mounting efficiency of electronic components.

Figure 3C:
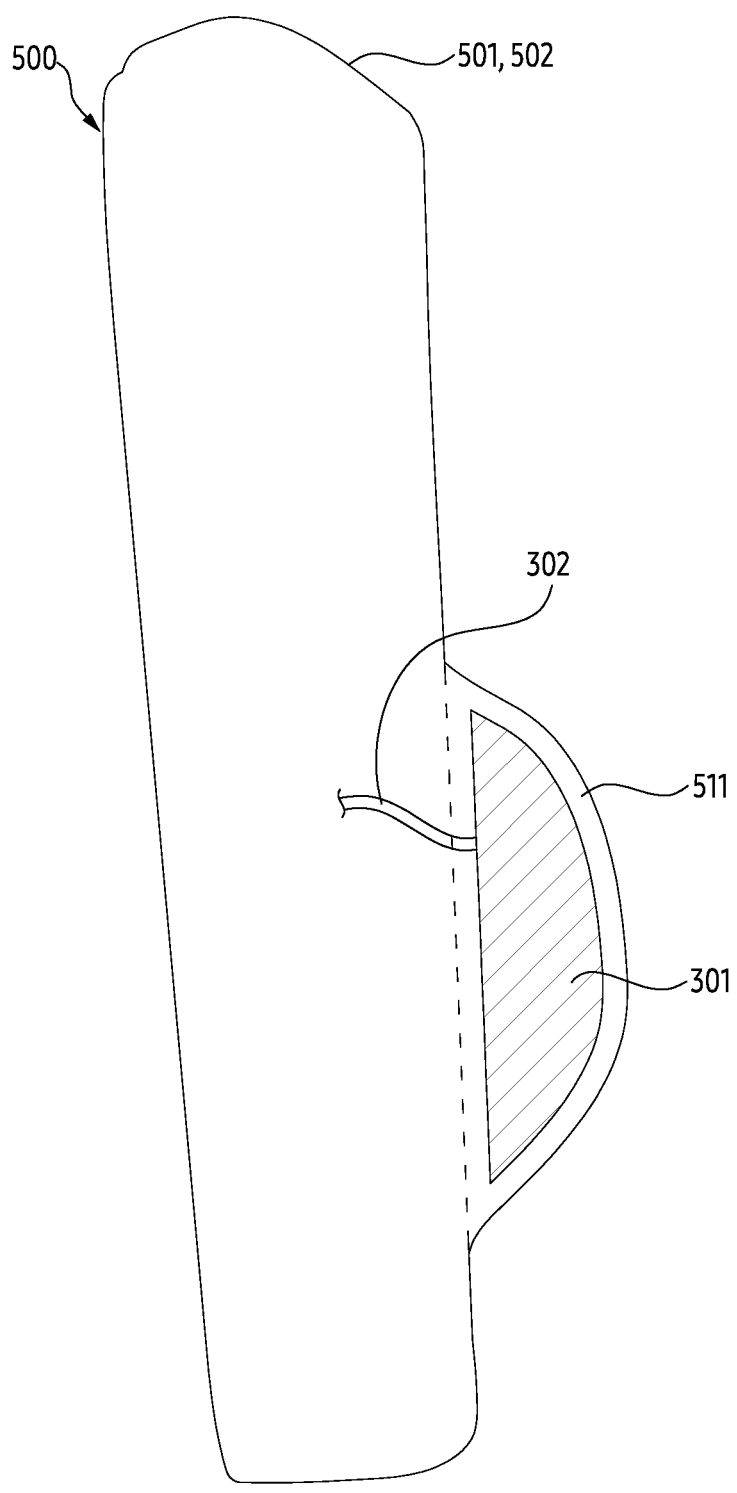
FIG. 3C is an example of a cross-section in which an electronic device according to an embodiment is cut along line A-A' of FIG. 2A.

FIG. 3C is an example of a cross-section in which an electronic device according to an embodiment is cut along line A-A' of FIG. 2A.

Referring to FIG. 3C, according to an embodiment, the conductive member 301 of the electronic device 101 may be formed by double injection molding and a support part 511 disposed between a plurality of rims 501 and 502. The support part 511 may be a configuration of a frame 500 including a bridge (e.g., a bridge 503 of FIG. 2A), a first pad (e.g., the first pad 504 of FIG. 2A), and a second pad (e.g., the second pad 505 of FIG. 2A). According to an embodiment, the support part 511 may include a material having low electrical conductivity, and the conductive member 301 positioned inside the support part 511 may include a material having high electrical conductivity. The conductive member 301 may be electrically connected to the first processor (e.g., the auxiliary processor 123 of FIG. 1) through the signal line 302. For example, the support part 511 may include a polymer, and the conductive member 301 may include a metal. Since the conductive member 301 is disposed adjacent to the support part 511 by double injection molding, when the user wears the electronic device 101, a change in capacitance of the conductive member 301 adjacent to the support part 511 in contact with a part of the user's body may occur. The first processor may identify a change in capacitance of the conductive member 301 through the signal line 302.

According to an embodiment, as described above, the electronic device 101 may generate a switching signal for detecting user's wearing and activating the second processor without using a separate sensor for detecting user's wearing by forming the conductive member 301 having high electrical conductivity in a part to be on the user's body. For example, according to an embodiment, when the electronic device 101 is worn by the user, the conductive member 301 disposed in the support part 511 is positioned on a part of the user's nose, thereby causing a change in capacitance and the first processor may generate a switching signal by identifying the change, and transmit the switching signal to the second processor (e.g., the main processor 121 of FIG. 1), so that the second processor may switch to an active state.

Figure 4A:
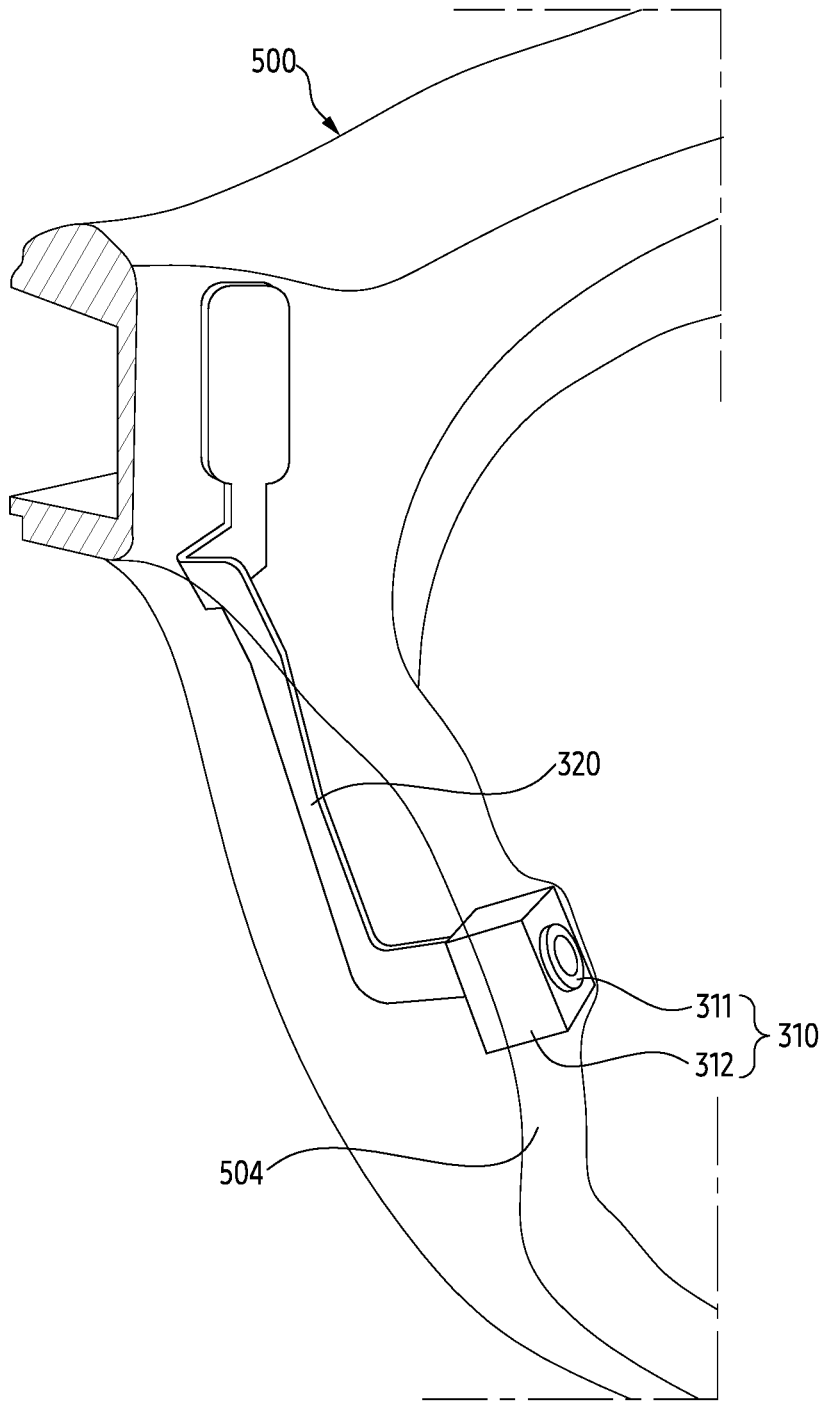
FIG. 4A illustrates a camera arrangement in an electronic device according to an embodiment.
Figure 4B:
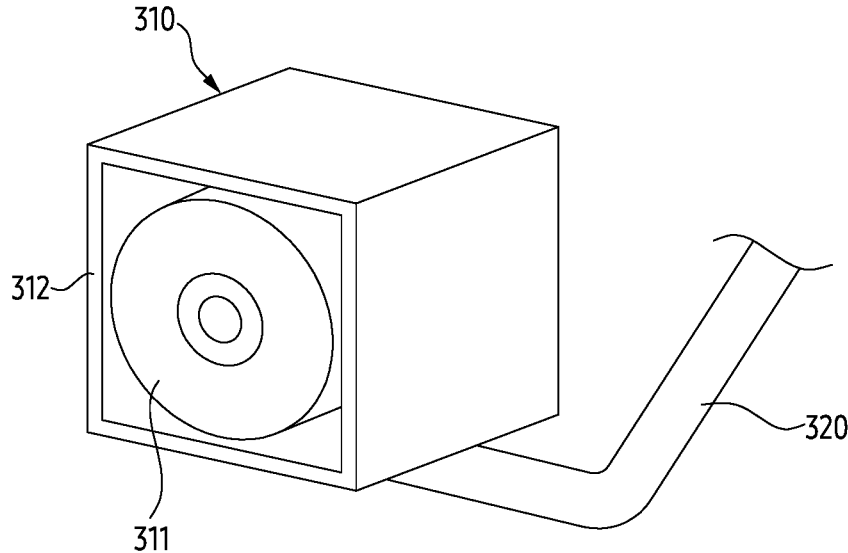
FIG. 4B is an example of a camera of an electronic device according to an embodiment.

FIG. 4A illustrates a camera arrangement in an electronic device according to an embodiment, and FIG. 4B illustrates an example of a camera of an electronic device according to an embodiment.

Referring to FIGS. 4A and 4B, an electronic component (e.g., the electronic component 300 of FIG. 2A) of the electronic device 101 according to an embodiment may include a camera 310 including a camera module 311 and a metal case 312 surrounding the camera module 311. In an embodiment, camera 310 may be a gaze tracking camera (e.g., gaze tracking camera 310b of FIG. 2B) that tracks a user's gaze. According to an embodiment, the first processor (e.g., the auxiliary processor 123 of FIG. 1) of the electronic device 101 may detect whether the electronic device 101 is worn by a user based at least in part on identification of a change in capacitance of the metal case 312.

The camera 310 may be disposed to face the eyes of the user wearing electronic device 101 to track the user's gaze. The metal case 312 may accommodate the camera module 311 therein. The metal case 312 may protect the camera module 311 from external impact. The metal case 312 may be spaced apart from the camera module 311 accommodated therein. The metal case 312 may perform a heat dissipation function of emitting heat generated by the operation of the camera module 311. For example, the metal case 312 may be connected to a conductive member extending from the camera module 311 to receive heat from the camera module 311. The metal case 312 may include silver, copper, or a metal material such as aluminum having high electrical conductivity. The metal case 312 may be electrically connected to the flexible printed circuit board 320. The metal case 312 may be electrically connected to the first processor through a signal line embedded in the flexible printed circuit board 320. The invention is not limited thereto, and the metal case 312 may be connected through a separate signal line distinguished from the flexible printed circuit board 320.

In an embodiment, the first processor may detect whether the electronic device 101 is worn by the user through a change in capacitance of the metal case 312. By including a metal having high electrical conductivity, the metal case 312 may change capacitance when positioned on the user's body. When the electronic device 101 is worn by the user, at least a part of the metal case 312 may be positioned on a part of the user's body. For example, the camera 310 may be disposed on at least one of the first pad 504 and the second pad (e.g., the second pad 505 of FIG. 2A). At least a part of the metal case 312 may be positioned on a part of the user's nose when the user wears the electronic device 101, thereby causing a change in capacitance of the metal case.

In an embodiment, the first processor electrically connected to the metal case 312 may be configured to identify a change in capacitance of the metal case 312. When the user wears the electronic device 101, the metal case 312 including a conductive material is positioned on a part of the user's body, thereby increasing capacitance. The first processor may be configured to generate a switching signal for switching the second processor (e.g., the main processor 121 of FIG. 1) to an active state based at least in part on identification of a change in capacitance of the metal case 312.

According to an embodiment, as described above, the electronic device 101 may detect the user's wearing and generate a switching signal using a metal case 312 surrounding the camera module 311 of the electronic device 101 without a separate sensor for detecting the user's wearing. For example, in the electronic device 101 according to an embodiment, when worn by a user, a metal case 312 including or made of a conductive material such as a magnesium alloy is in contact with or positioned on a part of the user's nose, thereby causing a change in capacitance, and the first processor may generate a switching signal by identifying the change and transmit the switching signal to the second processor, so that the second processor may switch to an active state.

Figure 4C:
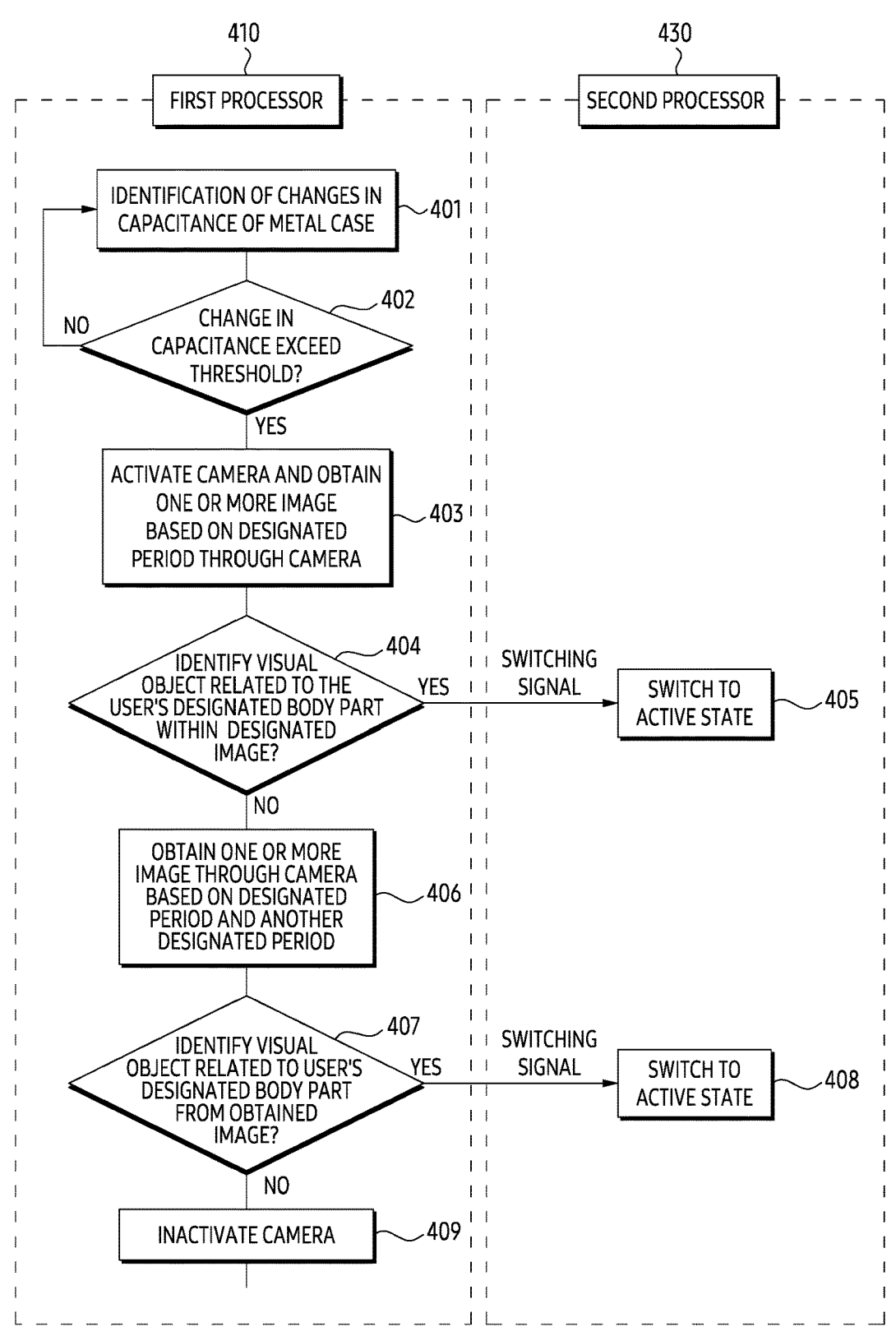
FIG. 4C illustrates an example of an operation of an electronic device in which a first processor of an electronic device transmits a switching signal to a second processor, according to an embodiment.

FIG. 4C illustrates an example of an operation of an electronic device in which a first processor of an electronic device transmits a switching signal to a second processor, according to an embodiment. This operation may be performed by the electronic device 101 illustrated in FIG. 1 or the electronic device 101 illustrated in FIG. 2.

Referring to FIG. 4C, in operation 401, the first processor 410 (e.g., the auxiliary processor 123 of FIG. 1) may identify a change in capacitance of the metal case 312 (e.g., the metal case 312 of FIG. 4A) while the second processor 430 (e.g., the main processor 121 of FIG. 1) is in an inactive state. For example, when the user wears the electronic device 101, the metal case 312 may be positioned adjacent to a part of the user's body, thereby causing a change in capacitance. The first processor 410 electrically connected to the metal case 312 may identify a change in capacitance of the metal case 312.

In operation 402, the first processor 410 may compare a change in the identified capacitance with a threshold. The threshold may be an amount of change in capacitance sufficient to determine that the metal case 312 is positioned adjacent to a part of the user's body. For example, the threshold may be set to distinguish between a case where the frame on which the metal case 312 is disposed approaches the user and a case where the frame on which the metal case 312 is disposed contacts the user's body. For example, the threshold may be a value smaller than the amount of change in capacitance when the frame on which the metal case 312 is disposed is in complete contact with the user's body.

In operation 403, the first processor 410 may activate the camera 310 in response to identifying a change in capacitance exceeding the threshold, and may obtain one or more images based on a designated period through the activated camera 310. Identification of a change in capacitance exceeding the threshold may be for a user to identify wearing an electronic device. The first processor 410 may transmit a signal to the camera 310 requesting the user to photograph one or more images based on the designated period in response to identifying the wearing of the electronic device. The camera 310 may capture one or more images based on the designated period in response to reception of the request signal. The first processor 410 may obtain one or more images captured from the camera 310.

In an embodiment, the one or more images may be one or more images of a part of the user's body. In an embodiment, the designated period may be a period of an operation in which the camera 310 performs photographing to obtain one or more images.

In operation 404, the first processor 410 may identify whether a visual object related to a designated body part of the user is included in one or more images in response to obtaining one or more images. In an embodiment, the designated body part of the user may be the user's pupil, and the visual object may be an image of the user's pupil within one or more images. The first processor 410 may transmit a switching signal for switching the state of the second processor 430 to the active state based on identifying that the visual object is included in one or more images to the second processor 430.

In operation 405, the second processor 430 may switch to an active state based on reception of the switching signal from the first processor 410. The second processor 430 is described as receiving a switching signal from the first processor 410, but is not limited thereto, the second processor 430 may receive the switching signal through the PMIC or other electronic component that receives the switching signal from the first processor 410.

In operation 405, the second processor 430 may be configured to switch the state of the second processor 430 from the inactive state to the active state based on reception of the switching signal. The electronic device 101 may perform a function of the electronic device 101 by switching the second processor 430 to an active state.

The one or more images may not include a visual object related to the user's body part. For example, when a user wearing electronic device 101 wears electronic device 101 and closes eyes, one or more images may not include an image of the user's pupil, and first processor 410 may not identify a visual object related to a designated body part of the user. The first processor 410 may perform operation 406 based on identifying that the visual object is not included in one or more images.

In operation 406, the first processor 410 may be configured to change the period of obtaining one or more images through the camera 310 to a designated period different from the designated period, based on identifying that the visual object is not included in one or more images. For example, the first processor 410 may be configured to change a period of obtaining one or more images through the camera 310 to a designated period longer than a period in operation 403. The first processor 410 may reduce power consumption of the electronic device and reduce the amount of computation of the first processor 410 by changing to a designated period longer than the period in operation 403.

In operation 407, the first processor 410 may identify whether the visual object is included within the one or more images in response to obtaining one or more images at the changed period. The first processor 410 may transmit a switching signal requesting switching the state of the second processor 430 to the active state based on identifying that the visual object is included in one or more images to the second processor 430.

In operation 408, the second processor 430 may be configured to switch the state of the second processor 430 from the inactive state to the active state based on reception of the switching signal. The electronic device 101 may perform a function of the electronic device 101 by switching the second processor 430 to an active state.

In operation 407, the first processor 410 may perform operation 409 based on identifying that the visual object is not included in one or more images.

In operation 409, the first processor 410 may deactivate the camera 310 based on identifying that the visual object is not included in one or more images. The camera 310 may stop the operation of obtaining one or more images by being deactivated.

According to an embodiment, as described above, the first processor 410 may primarily activate the camera 310 in response to identification of a change in capacitance of the metal case 312, and the electronic device 101 may secondarily generate a switching signal in response to identification of a visual object related to the user's body part through the camera 310. For example, when the electronic device 101 according to an embodiment is worn by a user, a change in capacitance occurs in the metal case 312 including or formed of a magnesium alloy, and the first processor 410 may activate the camera 310 by identifying the change in capacitance. The activated camera 310 may obtain one or more images by photographing a user's face and may identify whether an image related to the user's pupil is included in the obtained one or more images. The first processor 410 generates a switching signal in response to obtaining an image related to a pupil, transmits the switching signal to the second processor 430, and thus the second processor 430 may be switched to an active state. The electronic device 101 according to the above-described embodiment may activate the second processor 430 based on whether a user wearing the electronic device 101 is ready to use the electronic device 101 through the above-described two-step process.

Figure 5:
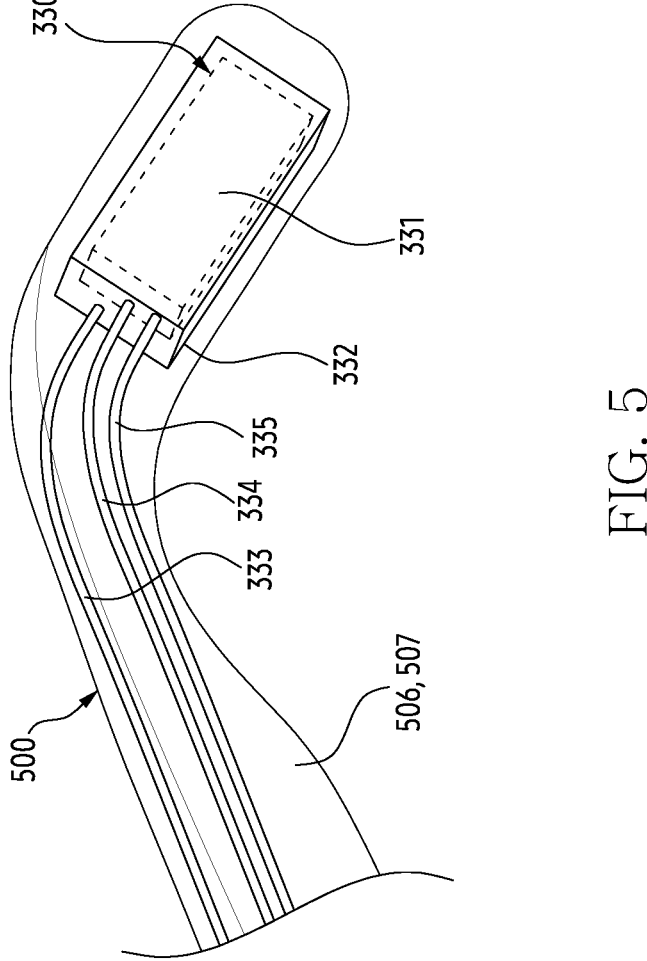
FIG. 5 illustrates an arrangement of a battery module of an electronic device according to an embodiment.

FIG. 5 illustrates an arrangement of a battery module of an electronic device according to an embodiment.

Referring to FIG. 5, an electronic component (e.g., the electronic component 300 of FIG. 2B) of the electronic device 101 according to an embodiment may include a battery module 330. According to an embodiment, the electronic device 101 may detect whether the electronic device 101 is worn by a user based at least in part on identification of a change in capacitance of the conductive cover 332 of the battery module 330.

In an embodiment, the battery module 330 may include battery cells 331 and a conductive cover 332. The battery cells 331 may be electrically connected to the display 200, the first processor (e.g., the auxiliary processor 123 of FIG. 1), and/or the second processor (e.g., the main processor 121 of FIG. 1). In an embodiment, the conductive cover 332 may be disposed to surround the battery cells 331. For example, the battery cells 331 may be battery cells 331 forming a lithium-ion battery. The conductive cover 332 may be a thin metal film surrounding the battery cells 331. For example, the conductive cover 332 may be a pouch surrounding the battery cell 331 in the form of a thin aluminum film. As another example, the conductive cover 332 may be an aluminum can accommodating the battery cell 331.

In an embodiment, the conductive cover 332 may include a conductive material. The conductive cover 332 may include or be formed of a material corresponding to an electrode formed outside the battery cell 331. In an embodiment, for example, where a cathode formed of aluminum is disposed outside the battery cell 331, the conductive cover 332 may be formed of aluminum. In an alternative embodiment, for example, where an anode formed of copper is disposed outside the battery cell 331, the conductive cover 332 may be formed of copper.

In an embodiment, when the conductive cover 332 including a conductive material is positioned on a part of the user's body, a change in capacitance may occur. The conductive cover 332 may be positioned on a part of the user's body when the electronic device 101 is worn by the user. For example, since the battery module 330 is disposed on the templates 506 and 507 of the frames 500 in contact with a part of the user's body wearing the electronic device 101, the conductive cover 332 may be disposed on at least a part of the user's face or at least a part of the user's ear.

In an embodiment, the conductive cover 332 may be electrically connected to the first processor. For example, the battery module 330 may include a first wire 334 connected to the cathode of the battery cell 331, a second wire 335 connected to the anode, and a signal line 333 connected to the conductive cover 332 and extending to the first processor. In an embodiment, the first wire 334, the second wire 335, and the signal line 333 may be disposed in one flexible printed circuit board. The conductive cover 332 may be positioned on a part of the user's body when the user wears the electronic device 101, thereby causing a change in capacitance. When a change in capacitance of the conductive cover 332 occurs, the first processor may identify a change in capacitance of the conductive cover 332 through the signal line 333. The first processor may be configured to generate a switching signal for switching the second processor to an active state, at least in part based on identifying a change in capacitance of the conductive cover 332.

According to an embodiment, as described above, the electronic device 101 may detect a user's wearing and generate a switching signal using a conductive cover 332 included in the battery module 330 for supplying power to the electronic device 101 without a separate sensor for detecting the user's wearing. For example, according to an embodiment, when worn by the user, the electronic device 101 causes a change in capacitance as the conductive cover 332 of the battery module 330 disposed within at least one of the first temple 506 and the second temple 507 contacts a part of the user's face and a part of the ear and accordingly, the first processor may generate a switching signal by identifying the change and transmit the switching signal to the second processor, so that the second processor may switch to an active state.

Figure 6:
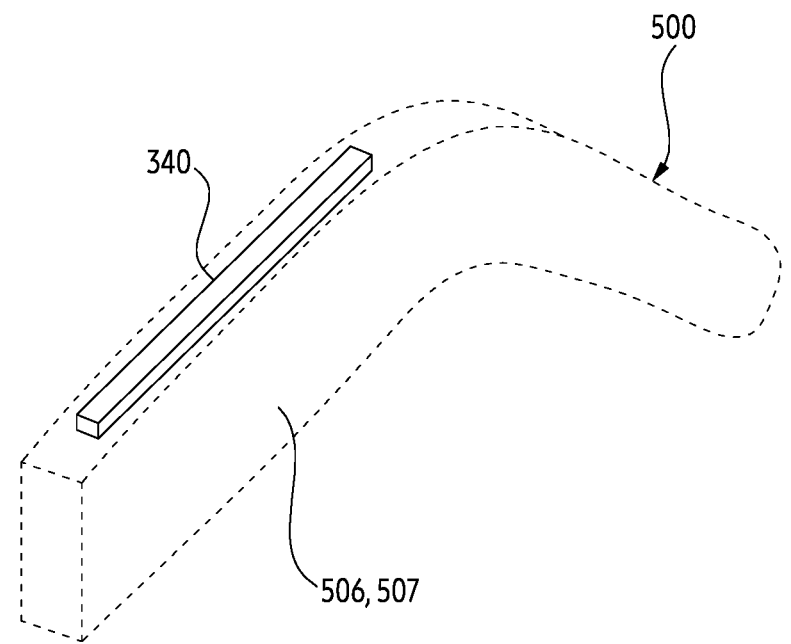
FIG. 6 illustrates an arrangement of an antenna module of an electronic device according to an embodiment.

FIG. 6 illustrates an arrangement of an antenna module of an electronic device according to an embodiment.

Referring to FIG. 6, an electronic device 101 according to an embodiment may include an antenna module 340. According to an embodiment, the electronic device 101 may detect whether the electronic device 101 is worn by a user based at least in part on identification of a change in capacitance of the antenna module 340.

In an embodiment, the antenna module 340 may include a conductor or conductive pattern formed on a substrate (e.g., a PCB). For example, the conductor or the conductive pattern may be an antenna radiator or an antenna array in which the antenna radiator is arranged. In an embodiment, when the conductor or conductive pattern of the antenna module 340 is located on a part of the user's body, a change in capacitance may occur. The antenna module 340 may be positioned on a part of the user's body when the electronic device 101 is worn by the user. For example, the antenna module 340 may be disposed in the frame 500 along the direction in which the templates 506 and 507 extend and may be positioned on at least a part of the side surface of the user wearing the electronic device 101.

The antenna module 340 may be electrically connected to the first processor (e.g., the auxiliary processor 123 of FIG. 1). The antenna module 340 may be positioned on a part of the user's body when the user wears the electronic device 101, thereby causing a change in capacitance. When a change in capacitance of the antenna module 340 occurs, the first processor may identify a change in capacitance of the antenna module 340. The first processor may be configured to generate a switching signal for switching the second processor (e.g., the main processor 121 of FIG. 1) to an active state based at least in part on identification of a change in capacitance of the antenna.

In an embodiment, the first processor may further identify an impedance change from the antenna module 340. When the antenna module 340 contacts or approaches a part of the user's body, an impedance value may change due to a high dielectric constant characteristic of the human body. For example, when the electronic device 101 is worn by the user, at least a part of the antenna module 340 may be in contact with or positioned on at least a part of the side of the user's face, and the impedance value may be lowered due to the high dielectric constant of the user's face. For example, impedance values at opposing ends of the antenna radiator included in the antenna module 340 may be changed by contact or proximity of a user. The antenna module 340 may include an impedance compensation circuit for compensating for the impedance change. The first processor may receive data related to an impedance change of the antenna module 340 through an impedance compensation circuit or an integrated circuit included in the antenna module 340. The first processor may be configured to identify a change in impedance of the antenna module 340 and generate a switching signal for switching the second processor to an active state based on at least a part of the change in impedance of the antenna module 340.

According to an embodiment, the first processor may receive a variation in capacitance or impedance of the antenna module 340 from the antenna module 340. The first processor may identify whether the user wears the electronic device 101 by using at least one of a change amount in capacitance and a change amount in impedance of the antenna module 340. For example, the first processor may complementarily utilize the amount of change in capacitance and the amount of change in impedance of the antenna module 340. For example, when the amount of change in capacitance is within a designated range from the threshold of the designated capacitance, the first processor may compare whether the amount of change in impedance is equal to or greater than the amount of change in the designated impedance.

According to an embodiment, as described above, the electronic device 101 may detect a user's wear and obtain an active signal using an antenna module 340 that transmits a signal or power from the outside of the electronic device 101 or receives from the outside without a separate sensor for detecting the user's wear. For example, according to an embodiment, when worn by the user, the electronic device 101 causes changes in capacitance and/or impedance by contacting a part of the user's face and a part of the ear with a conductor or conductive pattern of the antenna module 340 disposed within at least one of the first temple 506 and the second temple 507 and accordingly, the first processor may generate a switching signal by identifying the change, and transmit the switching signal to the second processor, so that the second processor may switch to an active state.

Figure 7:
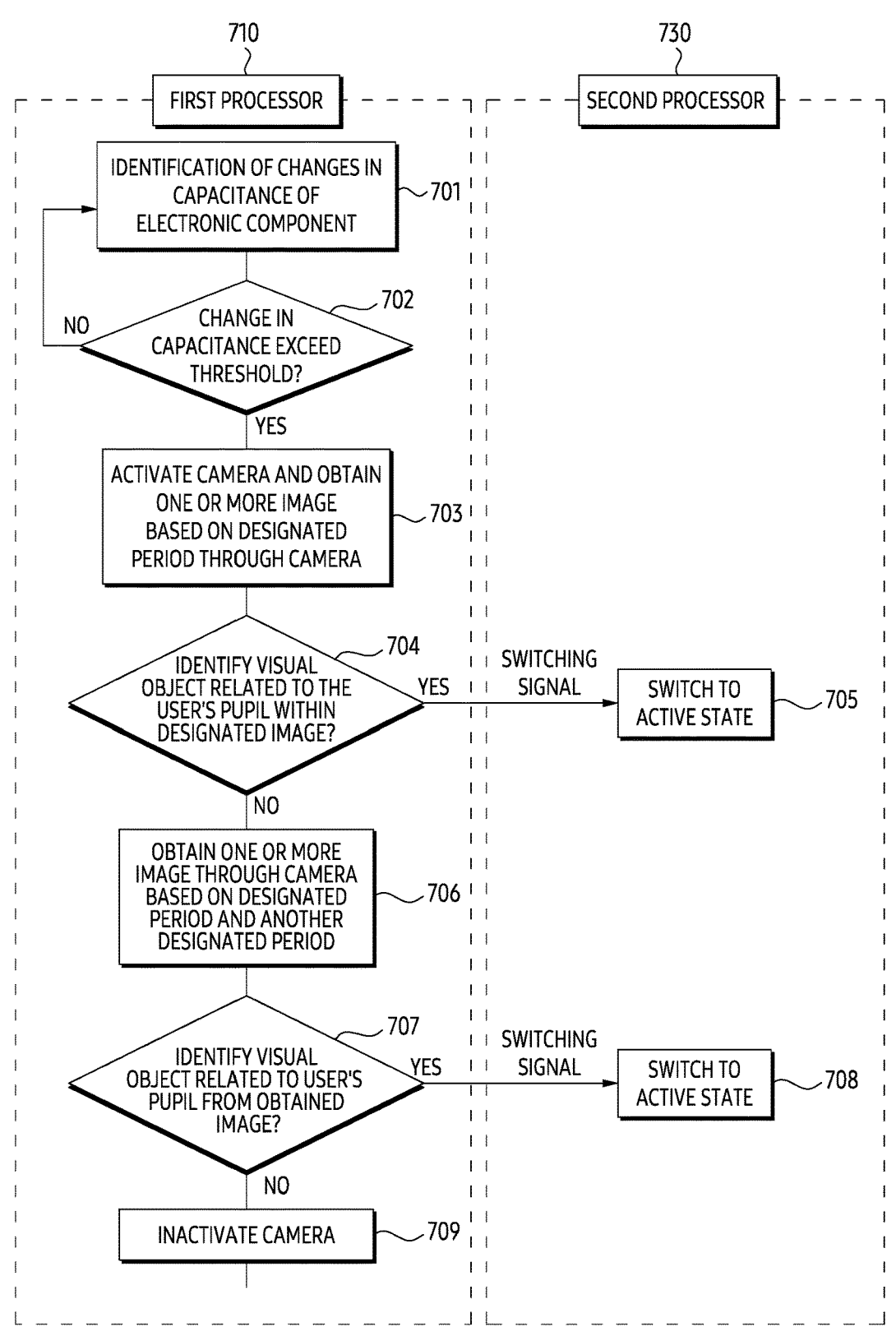
FIG. 7 illustrates an example of an operation of an electronic device for tracking a user's pupil position in order for the first processor of the electronic device to transmit a switching signal to the second processor, according to an embodiment.

FIG. 7 illustrates an example of an operation of an electronic device for tracking a user's pupil position in order for the first processor of the electronic device to transmit a switching signal to the second processor, according to an embodiment. This operation may be performed by the electronic device 101 illustrated in FIG. 1 or the electronic device 101 illustrated in FIG. 2. According to an embodiment, the electronic device 101 includes a camera 310 configured to track a user's gaze.

Referring to FIG. 7, in operation 701, the first processor 710 (e.g., the auxiliary processor 123 of FIG. 1) may identify a change in capacitance of at least one electronic component 300 while the second processor 730 (e.g., the main processor 121 of FIG. 1) is in an inactive state. In an embodiment, the electronic component 300 may be a camera 310, a battery module 330, and/or an antenna module 340. For example, the electronic component 300 may include a camera 310 including a camera module 311 and a metal case 312 surrounding the camera module 311. In the first processor 710, when the user wears the electronic device 101, at least a part of the metal case 312 is positioned adjacent to a part of the user's body and a change in capacitance may occur. The first processor 710 electrically connected to the electronic component 300 may identify a change in capacitance of the electronic component 300.

As another example, the electronic component 300 may include battery cells 331 and conductive covers 332 surrounding the battery cells 331. The first processor 710 may identify a change in capacitance that occurs when at least a part of the conductive cover 332 is positioned adjacent to a part of the user's body when the user wears the electronic device 101.

As another example, the electronic component 300 may include an antenna module 340. The first processor 710 may identify changes in capacitance and impedance that occur when at least a part of the antenna module 340 is positioned adjacent to a part of the user's body when the user wears the electronic device 101.

In operation 702, the first processor 710 may compare a change in the identified capacitance with a threshold. The threshold may be a fixed value, or a value determined differently according to the electronic component 300. The threshold may be an amount of change in capacitance sufficient to determine that the electronic component 300 is positioned adjacent to a part of the user's body. For example, the threshold may be set to distinguish between a case where the frame on which the electronic component 300 is disposed approaches the user and a case where the frame on which the electronic component 300 is disposed contacts the user's body. For example, the threshold may be a value smaller than the amount of change in capacitance when the frame in which the electronic component 300 is disposed is completely in contact with the user's body.

In operation 703, the first processor 710 may activate the camera 310 configured to track the user's gaze in response to identifying a change in capacitance exceeding the threshold, and obtain one or more images based on a designated period through the activated camera 310. For example, identification of a change in capacitance exceeding the threshold may be for a user to identify wearing an electronic device. The first processor 710 may transmit a signal to the camera 310 requesting the user to photograph one or more images based on the designated period in response to identifying the wearing of the electronic device. The camera 310 may capture one or more images based on the designated period in response to reception of the request signal. The first processor 710 may obtain one or more images captured from the camera.

As another example, the first processor 710 may obtain one or more images through the camera 310. In an embodiment, when identifying a change in impedance of the antenna module 340 exceeding the threshold, the first processor 710 may activate the camera 310 in response to identifying a change in impedance exceeding the threshold.

In operation 704, the first processor 710 may identify whether a visual object related to the pupil is included within the one or more images in response to obtaining one or more images. In an embodiment, the visual object related to the pupil may be an image of the user's pupil within one or more images. The first processor 710 may transmit a switching signal for switching the state of the second processor 730 to the active state based on identifying that the visual object related to the pupil is included in one or more images.

In operation 705, the second processor 730 may switch to an active state based on reception of the switching signal from the first processor 710. The second processor 730 is described as receiving a switching signal from the first processor 710, but is not limited thereto, and may receive the switching signal through the PMIC or other electronic component receiving the switching signal from the first processor 710.

In operation 705, the second processor 730 may be configured to switch the state of the second processor 730 from the inactive state to the active state based on reception of the switching signal. The electronic device 101 may perform a function of the electronic device 101 by switching the second processor 730 to an active state.

The one or more images may not include a visual object related to the user's pupil. For example, when a user wearing electronic device 101 wears electronic device 101 and closes eyes, one or more images may not include an image of the user's pupil, and first processor 710 may not identify a visual object related to a designated body part of the user. The first processor 710 may perform operation 706 based on identifying that the visual object is not included in one or more images.

In operation 706, the first processor 710 may be configured to change the period of obtaining one or more images through the camera 310 to a designated period different from the designated period, based on identifying that the visual object is not included in one or more images. For example, the first processor 710 may be configured to change a period of obtaining one or more images through the camera 310 to a designated period longer than a period in operation 703. The first processor 710 may reduce power consumption of the electronic device and reduce the amount of computation of the first processor 710 by changing to a designated period longer than the period in operation 703.

In operation 707, the first processor 710 may identify whether the visual object is included within the one or more images in response to obtaining one or more images at the changed period. The first processor 710 may transmit to the second processor 730, a switching signal requesting switching the state of the second processor 730 to the active state based on identifying that the visual object is included in one or more images.

In operation 708, the second processor 730 may be configured to switch the state of the second processor 730 from the inactive state to the active state based on reception of the switching signal. The electronic device 101 may perform a function of the electronic device 101 by switching the second processor 730 to an active state.

In operation 707, the first processor 710 may perform operation 709 based on identifying that the visual object is not included in one or more images.

In operation 709, the first processor 710 may deactivate the camera 310 based on identifying that the visual object is not included in one or more images. Camera 310 may stop the operation of obtaining one or more images by being deactivated.

According to an embodiment, as described above, in the electronic device 101, the first processor 710 may primarily activate the camera 310 in response to identification of a change in capacitance of the electronic component 300, and may secondarily generate a switching signal in response to identification of a visual object related to the user's pupil through the camera 310. For example, when the electronic device 101 according to an embodiment is worn by a user, a change in capacitance occurs in a metal case 312 including or formed of a magnesium alloy, and the first processor 710 may activate the camera 310 by identifying the change. The activated camera 310 may obtain one or more images by photographing a user's face, and may identify whether an image related to the user's pupil is included in the obtained one or more images. The second processor 730 may switch to an active state by obtaining a switching signal in response to obtaining an image related to a pupil and transmitting the switching signal to the second processor 730. The electronic device 101 according to an embodiment may activate the second processor 730 based on whether the user wearing the electronic device 101 is ready to use the electronic device 101 through the above-described two-step process.

According to an embodiment, a wearable device (e.g., the electronic device 101 of FIG. 1 or the electronic device 101 of FIG. 2A) may include at least one display (e.g., at least one display 200 of FIG. 2A) including a first surface and a second surface (e.g., the second surface 202 of FIG. 2B) opposite the first surface, where external light directed to the first surface (e.g., the first surface 201 of FIG. 2B) passes through the second surface such that information corresponding to the external light is displayed on the second surface; an electronic component (e.g., the electronic component 300 of FIG. 2B), disposed on a part of a user's body when the wearable device is worn by a user; a first processor may be operatively coupled to the electronic component; and a second processor may be operatively coupled to the second processor (e.g., the main processor 121 of FIG. 1); wherein the first processor (e.g., the auxiliary processor 123 of FIG. 1) may be configured to: identify a change in capacitance of the electronic component while the second processor is in an inactive state; and generate a switching signal for switching the second processor to an active state based at least in part on the identification, and wherein the second processor is configured to switch a state of the second processor from the inactive state to the active state based on a reception of the switching signal.

According to an embodiment, the wearable device may further include a frame (e.g., the frame 500 of FIG. 2A) supporting the at least one display, and wherein the electronic component includes a conductive member (e.g., the conductive member 301 of FIG. 3A) disposed on a region corresponding to the region of the frame in contact with a part of the user's body when the wearable device is worn by the user.

According to an embodiment, the electronic component may include a camera (e.g., camera 310 of FIG. 3A) and a flexible printed circuit board (e.g., the flexible printed circuit board 320 of FIG. 3A) extending from the camera and electrically connected to the first processor, and wherein the conductive member may be a thin metal film disposed on a non-conductive layer (e.g., the non-conductive layer 321 of FIG. 3B) of a flexible printed circuit board.

According to an embodiment, the at least one display may include a first display (e.g., the first display 210 of FIG. 2A) and a second display (e.g., the first display 220 of FIG. 2A) spaced apart from the first display, wherein the frame may include a first rim (e.g., the first rim 501 of FIG. 2A) surrounding the first display, a second rim (e.g., the second rim 502 of FIG. 2A) surrounding the second display, a bridge (e.g., bridge 503 of FIG. 2A) disposed between the first and the second rim, a first pad (e.g., the first pad 504 of FIG. 2A) disposed along a portion of an edge of the first rim from one end of the bridge and a second pad (e.g., the second pad 505 of FIG. 2A) disposed along a portion of an edge of the second rim from the other end of the bridge, and wherein the conductive member may extend to the first processor along an inside of at least one of the first pad and the second pad.

According to an embodiment, the frame may include a plurality of rims and a support part (e.g., support part 511 of FIG. 3C) disposed between the rims, and wherein the conductive member may be formed by double injection molding with the support part.

According to an embodiment, the electronic component may include a camera including a camera module (e.g., the camera module 311 of FIG. 4A) configured to track a user's gaze and a metal case (e.g., the metal case 312 of FIG. 4A) spaced apart from the camera module and surrounding the camera module, and wherein the metal case may be electrically connected to the first processor.

According to an embodiment, the at least a part of the metal case may be disposed on a part of the user's body when the wearable device is worn by the user, and wherein the first processor may be configured to identify the change in capacitance of the metal case.

According to an embodiment, the first processor may be configured to activate the camera in response to identifying the change in capacitance that exceeds a threshold, and obtain one or more images based on a designated period through the activated camera; identify a visual object associated with a designated body part of the user in the one or more images; and transmit the switching signal for switching the state of the second processor to the active state to the second processor, in response to the identification of the visual object.

According to an embodiment, the first processor may be configured to identify whether the visual object is included in the one or more images, in response to obtaining the one or more images; transmit the switching signal for switching the state of the second processor to the active state to the second processor based on identifying that the visual object is included in the one or more images; and change the period of obtaining the one or more images through the camera to another designated period different from the designated period based on identifying that the visual object is not included in the one or more images.

According to an embodiment, the processor may be configured to identify whether the visual object is included in the one or more images, in response to obtaining the one or more images; transmit the switching signal for switching the state of the second processor to the active state to the second processor based on identifying that the visual object is included in the one or more images; and deactivate the camera based on identifying that the visual object is not included in the one or more images.

According to an embodiment, the electronic component may include battery module (e.g., the battery module 330 of FIG. 5) including battery cells (e.g., the battery cell 331 of FIG. 5) electrically connected to the display, the first processor, and the second processor and conductive cover (e.g., the conductive cover 332 of FIG. 5) surrounding the battery cells, wherein the conductive cover may be located on a part of the user's body when the wearable device is worn by the user, and wherein the first processor may be electrically connected to the conductive cover and be configured to identify a change in capacitance of the conductive cover.

According to an embodiment, the electronic component may include an antenna module (e.g., the antenna module 340 of FIG. 6) for transmitting or receiving a signal or power to an outside of the wearable device, and wherein the antenna module may be electrically connected to the first processor.

According to an embodiment, the first processor may be configured to further identify a change in impedance from the antenna module while the second processor is in an inactive state; and generate a switching signal for switching the second processor to the active state based at least in part on the identified changes in the capacitance and the impedance.

According to an embodiment, a wearable device may comprise at least one display, including a first surface and a second surface opposite the first surface, and configured to go through the second surface for external light directed to the first surface and display information on the second surface; a frame including a plurality of rims surrounding at least one display and a support part disposed between the rims; an electronic component disposed on an area corresponding to an area of the frame in contact with a part of a user's body when the wearable device is worn by the user; a camera disposed in the frame and configured to track a user's gaze; a first processor operatively coupled with the camera and the electronic component; and a second processor operatively coupled to the first processor, wherein the first processor may be configured to: identify a change in capacitance of the electronic component while the second processor is within an inactive state; activate the camera in response to identifying a change in capacitance that exceeds a threshold, and obtain one or more images related to the user's pupil based on a designated period through the activated camera; identify a visual object related to the user's pupil in the one or more images; transmit the switching signal for switching the state of the second processor to the active state to the second processor, in response to the identification of the visual object; wherein the second processor may be configured to: switch the state of the second processor from the inactive state to the active state based on the reception of the switching signal.

According to an embodiment, the first processor may be configured to: identify whether the visual object is included in the one or more images, in response to obtaining the one or more images related to the user's pupil; transmit the switching signal for switching the state of the second processor to the active state to the second processor based on identifying that the visual object is included in the one or more images; change the period of obtaining the one or more images through the camera to a designated period different from the designated period based on identifying that the visual object is not included in the one or more images.

According to an embodiment, the first processor may be configured to: identify whether the visual object is included in the one or more images, in response to obtaining the one or more images related to the user's pupil; transmit the switching signal for switching the state of the second processor to the active state to the second processor based on identifying that the visual object is included in the one or more images; deactivate the camera based on identifying that the visual object is not included in the one or more images.

According to an embodiment, the camera may include a camera module and a metal case surrounding the camera module, wherein the first processor may be configured to identify the change in capacitance of the metal case.

According to an embodiment, the electronic component may include battery module including battery cells electrically connected to the display, the first processor, and the second processor and conductive cover surrounding the battery cells, wherein the conductive cover may be located on a part of the user's body when the wearable device is worn by the user, wherein the first processor electrically may be connected to the conductive cover and be configured to identify a change in capacitance of the conductive cover.

According to an embodiment, the electronic component may include an antenna module for transmitting or receiving a signal or power to an outside of the wearable device, wherein the antenna module may be electrically connected to the first processor.

According to an embodiment, the first processor may be configured to: further identify a change in impedance from the antenna module while the second processor is in an inactive state; generate a switching signal for switching the second processor to an active state based at least in part on the identified changes in the capacitance and the impedance.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. Thus, reference to "an" element in a claim followed by reference to "the" element is inclusive of one element and a plurality of the elements. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. As used herein, each of such phrases as "A or B," "at least one of A and B," "at least one selected from A and B," "at least one of A or B," "A, B, or C," "at least one of A, B, and C," "at least one selected from A, B, and C," and "at least one of A, B, or C," may include any one of, or all possible combinations of the items enumerated together in a corresponding one of the phrases. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Herein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

The invention should not be construed as being limited to the embodiments set forth herein. Rather, these embodiments are provided so that this disclosure will be thorough and complete and will fully convey the concept of the invention to those skilled in the art. While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A wearable device comprising:

at least one display configured to output light;

a waveguide configured to guide the light output from the at least one display toward a user's eye;

a first processor;

a second processor;

an electronic component disposed in the wearable device to face a user when the wearable device is worn by the user such that a change in capacitance of the electronic component is identified based on contact between the electronic component and a user's body, the electronic component including a camera; and memory storing instructions for causing the wearable device to:

identify a change in capacitance of the electronic component using the first processor, while the second processor is in an inactive state, activate the camera based on identifying that the change in capacitance exceeds a threshold using the first processor, obtain one or more images using the camera, generate a switching signal for switching a state of the second processor to an active state using the first processor, when a defined body part of the user is identified in the one or more images, and switch the state of the second processor from the inactive state to the active state, based on the switching signal.

2. The wearable device of claim 1, further comprising:

a frame supporting the at least one display, and wherein the electronic component includes a conductive member disposed in a portion of the frame in contact with the part of the user's body, when the wearable device is worn by the user.

3. The wearable device of claim 2, wherein the electronic component further includes a flexible printed circuit board extending from the camera and electrically connected to the first processor, and wherein the conductive member is a thin metal film disposed on a non-conductive layer of the flexible printed circuit board.

4. The wearable device of claim 3, wherein the at least one display includes a first display and a second display spaced apart from the first display, wherein the frame includes a first rim surrounding the first display, a second rim surrounding the second display, a bridge disposed between the first rim and the second rim, a first pad disposed along a portion of an edge of the first rim from one end of the bridge and a second pad disposed along a portion of an edge of the second rim from an opposing end of the bridge, and wherein the conductive member extends to the first processor along an inside of at least one selected from the first pad and the second pad.

5. The wearable device of claim 2, wherein the frame includes a plurality of rims and a support part disposed between the rims, and wherein the conductive member is formed by double injection molding with the support part.

6. The wearable device of claim 1, wherein the camera includes a camera module configured to track a user's gaze and a metal case spaced apart from the camera module and surrounding the camera module, and wherein the metal case is electrically connected to the first processor.

7. The wearable device of claim 6, wherein the at least a part of the metal case is disposed on the part of the user's body when the wearable device is worn by the user, and wherein the memory further stores instructions for causing the first processor to identify a change in capacitance of the metal case.

8. The wearable device of claim 6, wherein the memory stores instructions for causing the first processor to:

activate the camera in response to identifying that the change in capacitance exceeds the threshold, and obtain the one or more images based on a designated period through the activated camera;

identify a visual object associated with the defined body part of the user in the one or more images; and transmit the switching signal for switching the state of the second processor to the active state to the second processor, in response to an identification of the visual object.

9. The wearable device of claim 8, wherein the memory further stores instructions for causing the first processor to:

identify whether the visual object is included in the one or more images, in response to obtaining the one or more images;

transmit the switching signal for switching the state of the second processor to the active state to the second processor, based on identifying that the visual object is included in the one or more images; and change the designated period of obtaining the one or more images through the camera to another designated period different from the designated period, based on identifying that the visual object is not included in the one or more images.

10. The wearable device of claim 9, wherein the memory further stores instructions for causing the first processor to:

identify whether the visual object is included in the one or more images, in response to obtaining the one or more images;

transmit the switching signal for switching the state of the second processor to the active state to the second processor, based on identifying that the visual object is included in the one or more images; and deactivate the camera, based on identifying that the visual object is not included in the one or more images.

11. The wearable device of claim 1, wherein the electronic component includes:

a battery module including battery cells electrically connected to the display, the first processor and the second processor; and a conductive cover surrounding the battery cells, wherein the conductive cover is located on the part of the user's body, when the wearable device is worn by the user, and wherein the memory further stores instructions for causing the first processor electrically connected to the conductive cover to identify a change in capacitance of the conductive cover.

12. The wearable device of claim 1, wherein the electronic component includes an antenna module for transmitting or receiving a signal or power to an outside of the wearable device, and wherein the antenna module is electrically connected to the first processor.

13. The wearable device of claim 12, wherein the memory further stores instructions for causing the first processor to:

identify a change in impedance of the antenna module while the second processor is in an inactive state; and obtain a switching signal for switching the state of the second processor to the active state based at least in part on the change in the capacitance and the change in impedance.

14. A wearable device comprising:

at least one display including a first surface and a second surface opposite the first surface, wherein external light directed to the first surface displays information on the second surface;

an antenna module contacted on a part of a user's body when the wearable device is worn by a user;

a camera;

a processor including a first processor and a second processor; and memory storing instructions for causing the first processor to:

identify a change in impedance of the antenna module while the second processor is in an inactive state;

activate the camera to obtain one or more images based on an identification of the change in impedance; and generate a switching signal for switching a state of the second processor to an active state when a defined body part of the user is identified using the one or more images, and wherein the memory further stores instructions for causing the second processor to switch the state of the second processor from the inactive state to the active state, based on a reception of the switching signal.

15. The wearable device of claim 14, wherein the memory stores instructions for causing the first processor to:

activate the camera in response to identifying that the change in impedance exceeds a threshold, and obtain the one or more images based on a designated period through the activated camera;

identify a visual object associated with the defined body part of the user using the one or more images; and transmit the switching signal for switching the state of the second processor to the active state to the second processor, in response to an identification of the visual object.

16. The wearable device of claim 15, wherein the memory further stores instructions for causing the first processor to:

identify whether the visual object is included in the one or more images, in response to obtaining the one or more images;

transmit the switching signal for switching the state of the second processor to the active state to the second processor, based on identifying that the visual object is included in the one or more images; and change the designated period of obtaining the one or more images through the camera to another designated period different from the designated period, based on identifying that the visual object is not included in the one or more images.

17. The wearable device of claim 16, wherein the memory further stores instructions for causing the first processor to:

identify whether the visual object is included in the one or more images, in response to obtaining the one or more images;

transmit the switching signal for switching the state of the second processor to the active state to the second processor, based on identifying that the visual object is included in the one or more images; and deactivate the camera, based on identifying that the visual object is not included in the one or more images.

18. The wearable device of claim 14, further comprising a frame supporting the at least one display, wherein the at least one display includes a first display and a second display spaced apart from the first display, and wherein the frame includes a first rim surrounding the first display, a second rim surrounding the second display, a bridge disposed between the first rim and the second rim, a first pad disposed along a portion of an edge of the first rim from one end of the bridge and a second pad disposed along a portion of an edge of the second rim from an opposing end of the bridge.

* * * * *